Dec. 14, 1943.   H. S. JANDUS   2,336,545
FENDER SHIELD AND ASSEMBLY
Filed Feb. 20, 1941   4 Sheets-Sheet 1
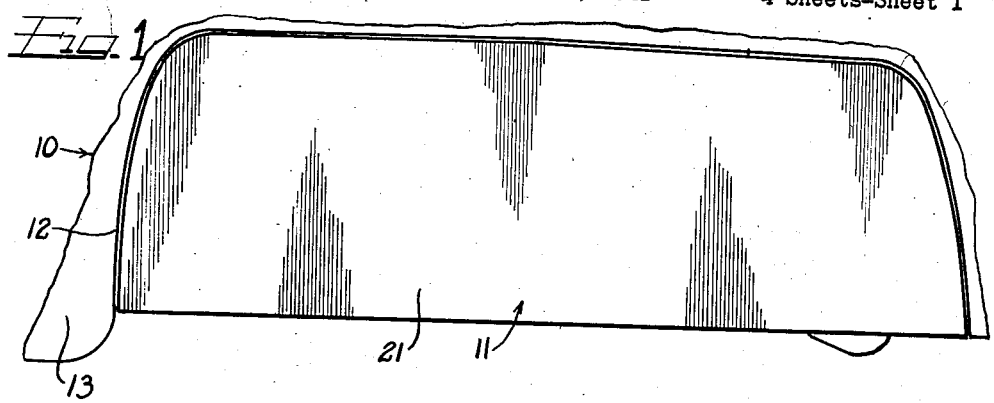
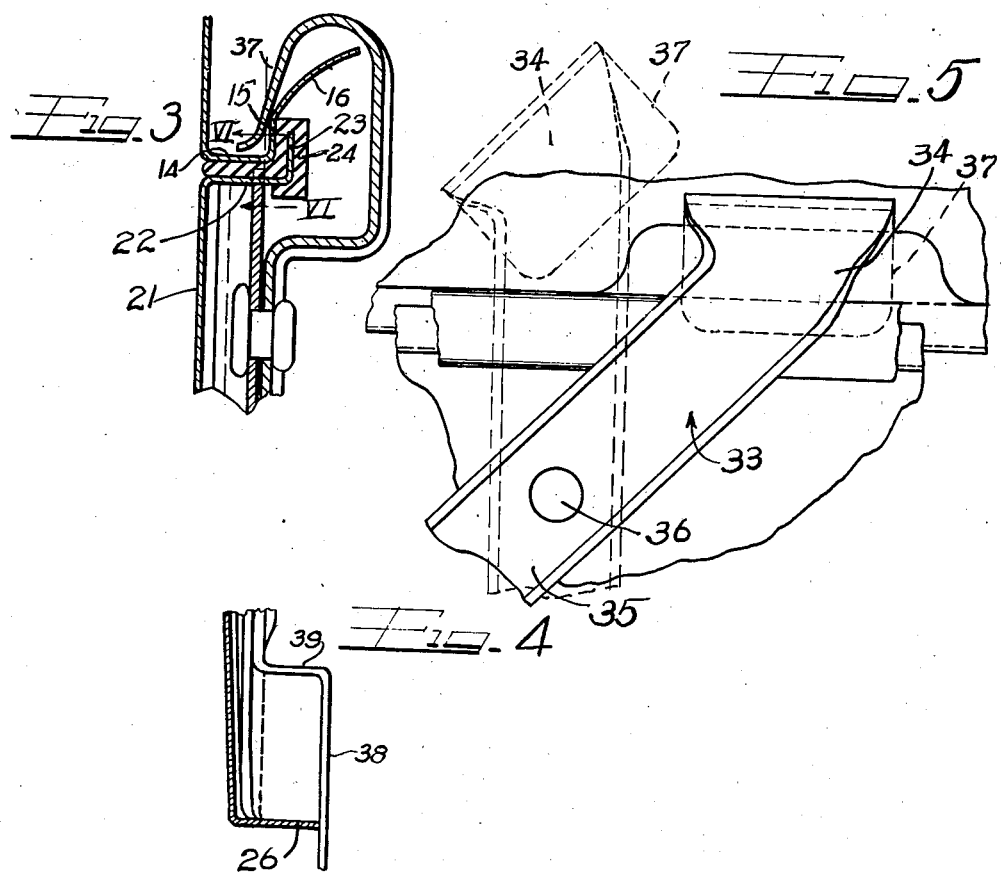
Inventor
Herbert S. Jandus

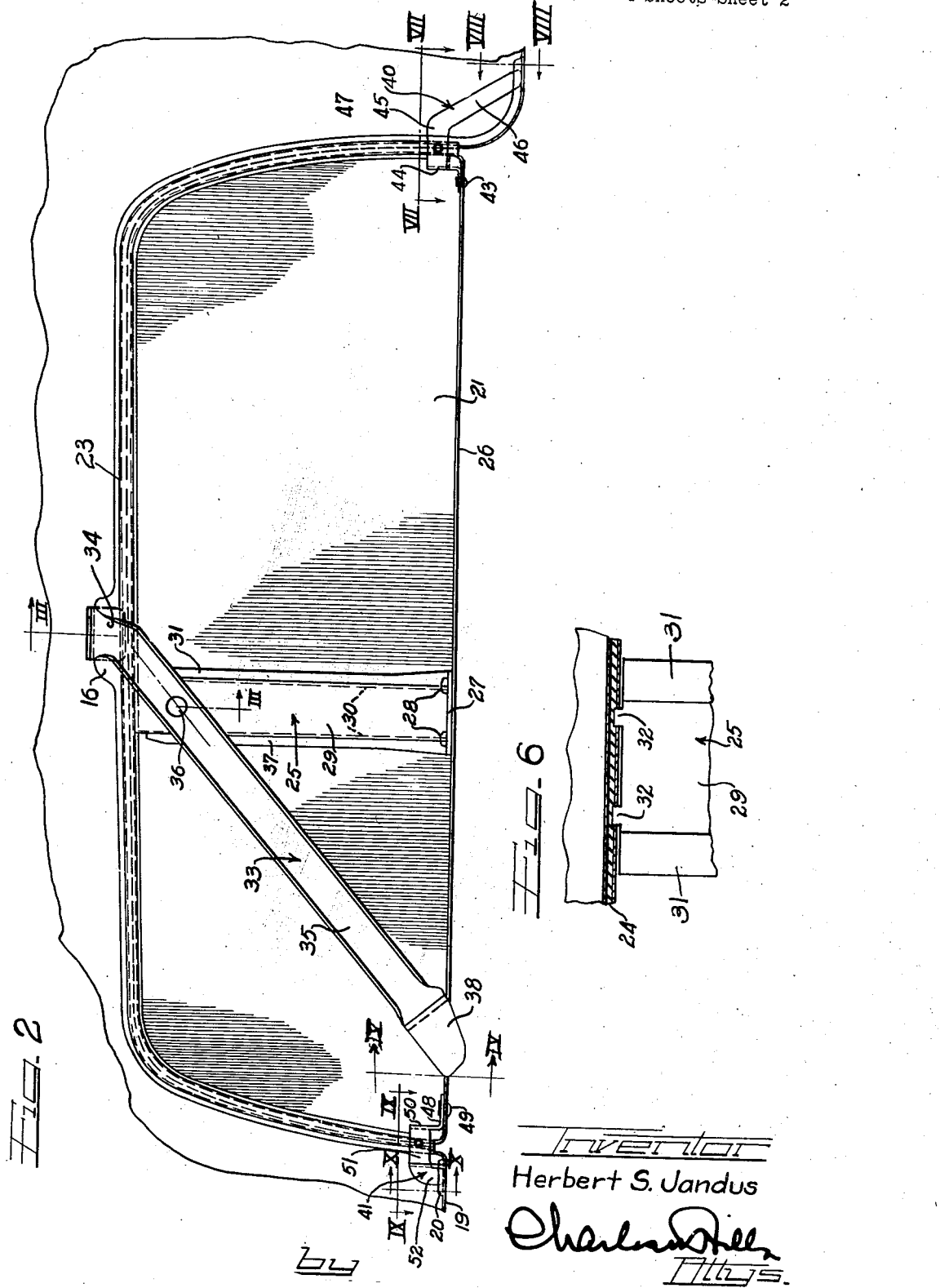

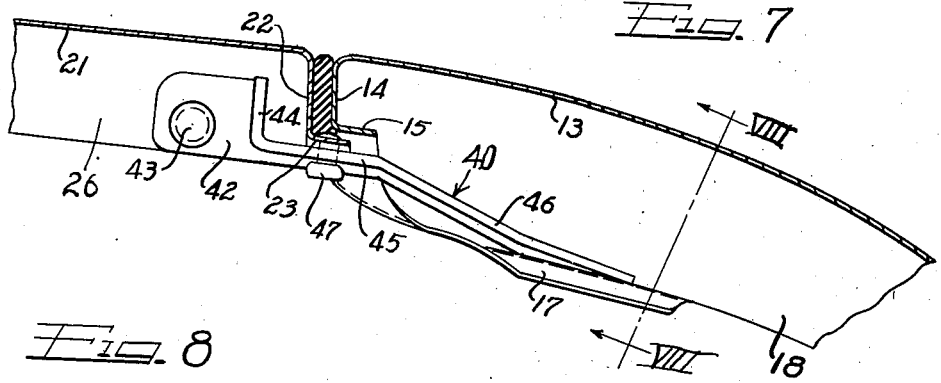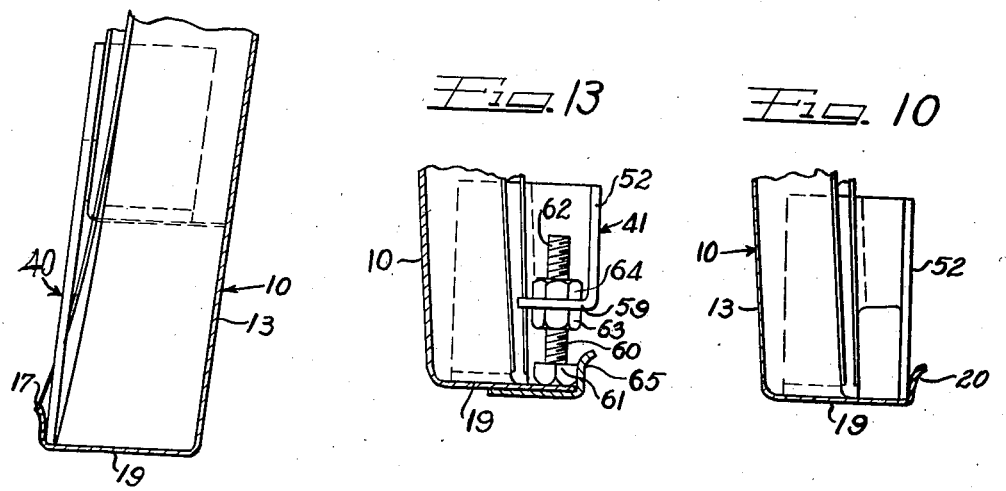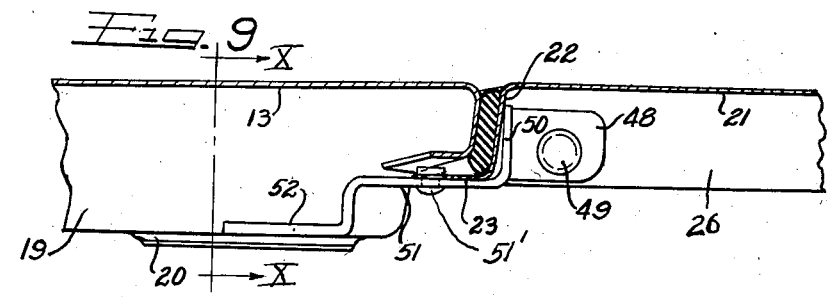

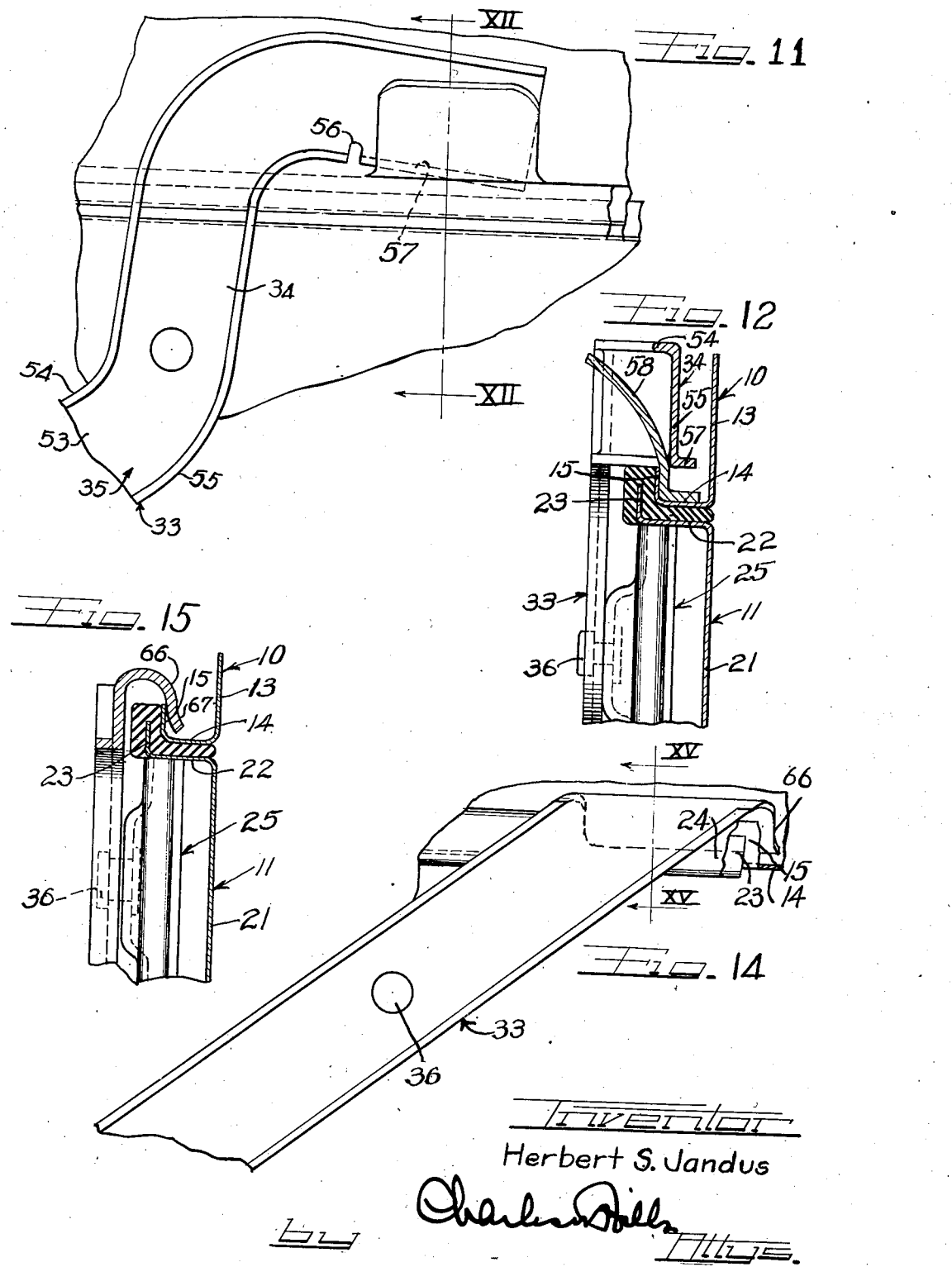

Patented Dec. 14, 1943

2,336,545

UNITED STATES PATENT OFFICE 2,336,545

FENDER SHIELD AND ASSEMBLY

Herbert S. Jandus, Detroit, Mich., assignor to Houdaille-Hershey Corporation, Detroit, Mich., a corporation of Michigan Application February 20, 1941, Serial No. 379,768

14 Claims. (Cl. 280—153)

This invention relates to a fender shield and assembly, and more particularly to a fender shield having novel mounting means thereon for detachably securing the fender shield to the fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in a generally axial direction. Since the modern trend of design has been to cover or partly cover this opening to improve the general appearance of the vehicle fender, detachable fender shields have been employed for this purpose.

As the term "fender shield" shall hereinafter be employed, it refers to any member which is adapted to be secured to a fender or other portion of a vehicle body for the purpose of covering the opening in the fender or vehicle body which is provided for access to and removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a fender shield of novel construction and characteristics and particularly a fender shield having a novel means for securing the fender shield to a vehicle fender.

It is a further object of the present invention to provide a fender shield and fender shield assembly which is economical to manufacture and which is rugged and reliable in use.

It is a still further object of the present invention to provide novel mounting means for a fender shield in which the two lower corners of a fender shield are first engaged with the adjacent corners of the fender opening and in which the shield is thereafter rocked forwardly from a position close to the wheel of the vehicle to a position against the inner depending side wall of the vehicle fender.

Another object of this invention is to provide a fender shield construction having means thereon for enabling the fender shield to be first rocked by hand in a direction transverse to the plane of the fender opening and then forced tightly against shoulder means on the vehicle fender or body part and secured in place there.

Another and still further object of the present invention is to provide a fender shield having novel trunnion members thereon and novel latching means for securing the shield in place on a vehicle fender.

A still further object of the present invention is to provide a fender having novel means thereon for receiving and latching a shield thereto.

The novel features which I believe to be characteristic of my invention are set forth with particularity in the appended claims. My invention itself, however, both as to its organization and manner of construction, together with further objects and advantages thereof, may best be understood by reference to the accompanying drawings, in which:

Figure 1 is a front elevational view of a portion of a vehicle fender with a fender shield mounted thereon;

Figure 2 is an enlarged rear elevational view of the fender shield assembly shown in Figure 1;

Figure 3 is a sectional view of the upper portion of the latching arm as taken along the line III—III of Figure 2;

Figure 4 is an enlarged sectional view showing the manner in which the latching member of Figure 2 is seated on the base flange of the fender shield;

Figure 5 is a greatly enlarged rear view of the upper portion of the rocking member shown in Figure 2 and also illustrating the manner in which the latching member is moved into and out of engagement with the vehicle fender;

Figure 6 is a sectional view of the upper end of the strut member of the fender shield as taken along the line VI—VI of Figure 3;

Figure 7 is a sectional view taken along the line VII—VII of Figure 2 looking down on the forward trunnion member or latching arm;

Figure 8 is a sectional view taken along the line VIII—VIII of Figure 2 showing an end view of the forward member or latching arm;

Figure 9 is a sectional view along the line IX—IX of Figure 2 looking down on the rear trunnion member or latching arm;

Figure 10 is a sectional view taken along the line X—X of Figure 2 showing an end view of the rear trunnion member or latching arm;

Figure 11 illustrates a modification of the first embodiment of the present invention and shows in particularity a modified form for the upper end of the latching lever;

Figure 12 is a sectional view taken along the line XII—XII of Figure 11;

Figure 13 shows a modified trunnion member or latching arm which may be employed with the modified form of the invention shown in Figures 11 and 12;

Figure 14 shows a third embodiment of the present invention with particular reference to a modified form for the upper portion of the latching lever; and, Figure 15 is a sectional view taken along the line XV—XV of Figure 14.

Referring now to the first embodiment of the present invention which is illustrated in Figures 1 to 10 of the drawings, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may, indeed, be formed integral and made a part of the body itself (not shown), the fender 10 has been illustrated as being of a high crown type. The fender shield 11 is detachably mounted on the vehicle fender 10 and is positioned to cover the relatively large opening 12 in the outer side wall 13 of the fender 10 which is conventionally provided in all vehicle fenders to provide access to and removal of the vehicle wheel therethrough.

The fender shield 11 is designed to be mounted so that its outer face is substantially flush with the outer face of the downwardly depending wall 13 of the fender 10. The edge of the fender around the fender opening 12 is provided with a rearwardly bent shoulder or flange portion 14 (Figures 3 and 7) which terminates in a turned back marginal portion or flange 15. This turned back marginal portion or flange 15 is somewhat enlarged at the point where the latching lever is arranged to engage it to form an obliquely rearwardly extending lip 16. This lip portion 16 provides a cam surface for a purpose which will presently be explained.

The marginal portion or flange 15 continues around the entire fender opening 12 and merges into a lip portion 17 at its forward end which is integral with the flat base flange 18 on the fender 10. The fender 10 is also provided with a flat base flange 19 at the opposite end of the fender which is provided with an upturned lip 20 which is integral therewith and which is located in proximity to the corner of the fender opening.

The fender shield 11 comprises a sheet metal panel 21 which is large enough to extend completely across the opening 12 in the fender 10. More specifically, it is dimensioned to fit snugly against the shoulder flange 14 of the fender 10. The top and end edges of the fender shield 11 are bent back into a flange portion 22 which lies opposite the shoulder flange 14 of the fender 10. The flange 14 terminates in a marginal flange 23 which is of such dimension as to extend behind the marginal portion 15 of the fender 10 (see Figures 7 and 9).

In order to prevent a direct metal to metal contact between the fender shield 11 and the fender 10 a rubber molding strip or bead 24 overlies the shoulder flange 22 and extends around the marginal flange 23 of the fender shield 11. The rubber molding 24 may be bonded, riveted or otherwise suitably secured to the fender shield.

The fender shield 11 is reinforced by a brace bar or strut 25 which extends upwardly behind the panel 21 from the lower base flange 26 of the fender shield 11 to a point in proximity to the top of the fender shield. This strut 25 has a base portion 27 by which it is riveted or bolted to the base flange 26 as at 28. As shown in the drawings, the strut 25 is preferably channel-shaped in cross-section and includes a web portion 29, side flanges 30 and wing portions 31.

As may be seen best in Figure 6, the upper end of the strut 25 is provided with a pair of ears 32 which are integral with the web portion 29 and which extend up through holes in the shoulder flange 22 of the fender shield 11. As an inspection of Figure 6 will show, the ears 32 not only extend through the openings in the shoulder flange 22 but also extend slightly into the rubber molding 24.

Mounted on the strut 25 is a supporting and latching arm 33 which includes a short leg portion 34 and a relatively long leg portion 35, disposed at an angle with respect to the short leg portion 34. This latching arm 33 may be conveniently mounted on the strut 25 by a mounting stud or rivet 36 carried on the strut 25. The short leg portion 34 of the latching arm 33 is substantially U-shaped in vertical transverse cross-section, as is clearly shown in Figure 3. More particularly, the short leg portion 34 has a bent end 37 which is shaped to extend around and down in front of the lip 16 and the marginal flange 15 of the fender 10. From an inspection of Figure 3 of the drawings, it will readily be understood the curled latching portion 37 of the latching lever 33 is rocked from the position as shown by the dotted lines in Figure 5 to the position shown by the full lines in Figures 3 and 5, the obliquely flaring lip portion 16 acting as a cam plate which stresses the fender shield forwardly into desired position.

The long leg 35 of the latching arm 33 extends downwardly to the bottom of the assembly and its lower end 38 is offset by a connecting shoulder 39 from the main portion of the latching lever 33. As an inspection of Figures 2 and 4 of the drawings will show, the end portion 38 extends down behind the base flange 26 of the fender shield 11, while the connecting portion 39 is seated on the base flange 26 of the fender shield 11.

A vertical support for the fender shield 11 on the fender 10 is provided by a pair of trunnion members or latching arms 40 and 41. As will presently be more fully understood, the trunnion members or latching arms 40 and 41 not only provide vertical support for the fender shield but also hold the fender shield in tight engagement against the fender 10 and prevent separation of the two members at the lower part of the assembly. Figures 7 and 8 illustrate in detail the trunnion member or latching arm 40 located at the leading edge of the fender. More particularly, the trunnion member or latching arm 40 has a base portion 42 which is seated on the base flange 26 of the fender shield 11 and is riveted or otherwise suitably secured thereto as at 43. The latching arm 40 extends upwardly from the base flange 26 as at 44, then horizontally toward the fender as at 45 and finally obliquely downwardly as at 46 into seated engagement with the base flange 18 of the fender 10 behind the integral upstanding cam lip 17. In order to obtain the desired rigidity, the horizontally extending portion 45 is riveted to the marginal flange 23 of the fender shield 11 as at 47.

The supporting arm 41 at the opposite end of the fender shield is generally similar in construction and is provided with a base portion 48 which is riveted to the base flange 26 of the fender 11 as at 49. The base portion 48 merges into the upwardly extending portion 50 which then merges into a horizontally extending portion 51 and finally terminates in a downturned portion 52. The downturned portion 52 is arranged to fit in behind the integral upstanding cam lip 20 which extends up from the base flange 19 of the fender 10. The horizontal portion 51 is riveted or bolted to the marginal flange 23 of the fender shield 11, as at 51'.

To mount the fender shield 11 on the fender 10 the shield is lifted up on the under side of the fender 10 and the two supporting arms 40 and 41 are hooked in behind the upturned lips 17 and 20 until the lower extremity of the two arms 40 and 41 are seated on the base flanges 18 and 19 of the fender 10. The fender shield when it is moved up to this position has its latching arm 33 disposed so that the long leg portion 35 extends substantially vertically downwardly. After the supporting arms 40 and 41 have been hooked in behind the lips 17 and 20 the shield is rocked forwardly into the opening 12 provided in the downwardly depending wall 13 of the fender 10. When the shield is in such a position that the rubber molding 24 first engages the shoulder flange 14 of the fender 10 the long wide portion 35 of the latching arm 33 is swung toward the trailing edge of the fender shield which causes the end portion 37 of the short leg 34 to ride down the cam surface provided by the flaring lip 16. As the end portion 37 of the short leg 34 rides down the cam surface the fender shield is pulled tightly into the opening defined by the shoulder 14. In other words, the rubber molding 24 now makes a tight seated engagement against the shoulder 14 of the fender 10 and also against the marginal flange portion 15 of the fender 10. The shield is held in tight seated engagement on the fender by virtue of the fact that the supporting arms 40 and 41 prevent the lower corners of the fender shield from moving backwardly away from the fender while the latching arm 33 prevents the top edge of the fender shield from moving away from the fender. The supporting arms 40 and 41 also provide the necessary vertical support for the fender shield.

In Figures 11, 12 and 13, I have illustrated a second embodiment of the present invention. In this form of the invention the fender and fender shield are the same as that above described, with the following noted exceptions. The upper end of the latching arm 33 which forms the short leg portion 34 is shaped so that the latching arm as a whole has an N-shaped bend in it approximately at the point where it is secured to the strut 25. The latching arm 33 is formed of channel stock and includes a web portion 53 and side wall portions 54 and 55. The short leg portion 34 of the latching lever 33 is notched through the side wall 55 and slightly back into the web 53 as is indicated at 56 in Figure 11. The side wall 55 beyond the notch 56 is bent in the opposite direction from the web 53 into a flange portion 57 as shown in Figure 12. This enables the web portion 55 and the base of the flange portion 57 to ride down the lip 58, which in this case is a separate piece of metal welded or otherwise suitably secured to the shoulder flange 14 and marginal flange 15 of the fender 10.

In this second embodiment of the present invention, the downwardly turned portion 52 of the supporting arm 41 is provided with an inturned end 59 to which an adjustable foot 60 is secured, as shown in Fig. 13. More particularly, the adjustable foot 60 is in the form of a bolt having a head 61 and a shank portion 62. The head 61 is arranged to be seated on the base flange 19 of the fender 10, nuts 63 and 64 are screwed onto the threaded shank portion 62 and on either side of the end portion 59. This construction provides a support foot which may be adjusted in height as desired.

It will also be observed, from an inspection of Figure 13, that the upstanding lip 65, which corresponds to the lip 20, is formed of a separate piece of metal which is spot welded or otherwise suitably secured to the under side of the base flange 19 of the fender 10.

The supporting arm at the opposite end of the fender shield, which corresponds to the supporting arm 40 of the first embodiment of the invention, is provided with a similarly constructed tip portion, which I have described in connection with Figure 13.

A third embodiment of the present invention is illustrated in Figures 14 and 15 of the drawings. More specifically, the third embodiment of the present invention is similar to the first embodiment, with the following noted exceptions as to the construction of the upper portion of the latch lever 33 as the portion of the fender to which it is associated. As is clearly shown in Figures 14 and 15, the latch lever 33 is a substantially straight member of channel-shaped cross-section which is mounted on the strut 25 by a mounting stud or rivet 36. The upper end of the latch lever 33 is bent over in an open fold as at 66, which fold extends diagonally across the latching lever 33. The folded down portion 66 is arranged to extend behind the marginal flange 15 of the fender 10. Instead of providing a large lip on the marginal flange 15, as has been described in connection with the two previous embodiments of the invention, the downturned folded portion 66 is flared outwardly as at 67 to provide the necessary cam surface.

The second and third embodiments of the present invention which have been described in connection with Figures 11 to 15 of the drawings are mounted and dismounted from the fender in a manner similar to that described in connection with the first embodiment of the invention. In each case the shield is lifted up on the under side of the fender and the supporting arms 40 and 41 then hooked into engagement with the base flanges 18 and 19 and behind the upstanding lips 17 and 20. The shield is then rocked forwardly in a plane transverse to the plane of the fender opening until the rubber molding engages the shoulder flange 14 of the fender 10. The latching lever is then rocked about its mounting stud 36 which causes the fender shield to be pulled still further forward around its upper curved edge until the rubber molding 24 is fully seated on the shoulder flange 14 and the marginal flange 59.

While I have shown a particular embodiment of my invention, it will, of course, be understood that I do not wish to be limited thereto since many modifications may be made, and I, therefore, contemplate by the appended claims to cover all such modifications as fall within the true spirit and scope of my invention.

I claim as my invention:

1. For a fender having a downwardly depending outer face with a wheel access opening therein, said fender having an upstanding lip behind and spaced from said outer face and above said opening, a fender shield for covering said opening having means thereon supporting said shield on the under side of said fender and behind said outer face, and a latching lever pivotally mounted on the rear of said shield having a hand grip portion extending to a point in proximity to the base of said shield and a latching portion having a downwardly turned end part for interlocking engagement with said upstanding lip, thereby to retain said shield in tight secured engagement with said fender.

2. Latching means for securing a fender shield to a fender comprising, a substantially straight latching lever pivotally mounted intermediate its ends on the rear of said fender shield and extending obliquely across the rear thereof when in latching position, the upper end of said lever being bent toward said shield and then downwardly in an open fold, the line of fold of said upper end extending obliquely across said lever.

3. For a fender having a downwardly depending outer face with a wheel access opening therein, said fender having an upstanding lip behind and spaced from said outer face and above said opening, a fender shield for covering said opening having means thereon supporting said shield on the under side of said fender and behind said outer face, and a substantially straight latching lever pivotally mounted intermediate its ends on the rear of said fender shield and extending obliquely across the rear thereof when in latching position, the upper end of said lever being bent toward the face of said shield and then downwardly, the line of bend of said upper end extending obliquely across said lever, said bent end being arranged to interengage said upstanding lip of said fender to latch said shield tightly against said fender.

4. Latching means for securing a fender shield to a fender comprising a latching lever pivotally mounted intermediate its ends on the rear of said fender shield, said lever being of channel-shaped cross section throughout a major portion of its length and including a web portion and marginal wall portion, the marginal wall portion on one side of said lever adjacent one end thereof being bent away from said web portion in the opposite direction from the remaining part of said wall portion on the same side of said lever.

5. Latching means for securing a fender shield to a fender comprising a latching lever pivotally mounted intermediate its ends on the rear of said fender shield, said lever being of channel-shaped cross section throughout a major portion of its length and including a web portion and marginal wall portion, the marginal wall portion on one side of said lever in proximity to one end thereof being cut away, the marginal wall part on one side of said cut away portion being bent away from said web portion in the opposite direction from the remaining part of said wall part on the opposite side of said cut away portion.

6. For a fender having a downwardly depending outer face with a wheel access opening therein, said fender having an upstanding lip behind and spaced from said outer face and above said opening, a fender shield for covering said opening having means thereon supporting said shield on the under side of said fender and behind said outer face, and a latching lever pivotally mounted intermediate its ends on the rear of said fender shield, said lever being of channel-shaped cross section throughout a major portion of its length and including a web portion and a marginal web portion, the marginal web portion on one side of said lever in proximity to said upstanding lip on said fender being bent away from said web portion in the opposite direction from the remaining part of said wall portion on the same side of said lever, said web portion and said lever adjacent said oppositely bent wall portion being arranged to engage said upstanding lip to latch said fender shield to said fender.

7. A fender having a downwardly depending outer face with a wheel access opening therein, a marginal portion of said fender around the opening being inturned to form a stiffening flange, and an upwardly and inwardly flaring lip rising from said flange, said lip providing a latching part for receiving the latching lever of a fender shield.

8. The combination comprising a fender having a downwardly depending outer face with a wheel access opening therein, a marginal portion of said fender around the opening being inturned to form a stiffening flange, an upwardly and inwardly flaring lip rising from said flange, said lip providing a latching cam surface, a fender shield for covering said opening having means thereon supporting said shield on the underside of said fender and behind said outer face, and a latching lever pivotally mounted on the rear of said shield having a hand grip portion extending to a point in proximity to the base of said shield and a latching portion having a downwardly turned end part for interlatching engagement with said upstanding lip.

9. The combination comprising a fender having a downwardly depending outer face with a wheel access opening therein, a marginal portion of said fender around the opening being inturned to form a stiffening flange, an upwardly and inwardly flaring lip rising from said flange, said lip providing a latching cam surface, a fender shield for covering said opening having means thereon supporting said shield on the underside of said fender and behind said outer face, and a latching lever pivotally mounted on the rear of said shield having a hand grip portion extending to a point in proximity to the base of said shield and a latching portion having a downwardly turned end part arranged to be moved into engagement with said latching cam surface as said lever is rocked toward latching position, said downwardly turned end part being forced toward the front face of said fender as it rides down said cam surface, thereby to pull said fender shield tightly against said fender.

10. The combination comprising a fender having a downwardly depending outer face with a wheel access opening therein, a marginal portion of said fender around the opening being inturned to form a stiffening flange, an upwardly rising latching lip secured to said flange, said lip having a convex surface on the side toward the depending outer face of said fender, a fender shield for covering said opening having means thereon supporting said shield on the under side of said fender and behind said outer face, and a latching lever movably mounted on the rear of said shield and having a portion thereof movable over said convex surface of said lip to pull said fender shield into tight engagement with said fender and retain the same thereon.

11. Latching means for securing a fender shield to a fender comprising a latching lever pivotally mounted intermediate its ends on the rear of said fender shield, said lever being substantially straight throughout a major portion of its length and arranged to be positioned diagonally across the rear of said fender shield when in latching position, the upper end of said lever extending upwardly at an angle to the main lever body and then downwardly in an open fold for latching engagement with a vehicle fender.

12. A fender shield including a panel portion having top, end and base flanges extending therefrom, and a supporting arm having a base part secured to said base flange, an intermediate part rising from said base part, a second intermediate part extending substantially horizontally from said first intermediate part, and terminating in a downwardly extending fender shield supporting foot, said second intermediate part being secured to one of said end flanges.

13. A fender shield including a panel portion having top, end and base flanges extending therefrom, and a supporting arm formed of sheet material having a base part secured to said base flange, an intermediate part rising from said base part and lying in a plane substantially perpendicular to said panel portion, a second intermediate part extending substantially horizontally from said first intermediate part and lying in a plane substantially parallel to said panel portion, a third intermediate part extending from said second intermediate part and lying in a plane substantially perpendicular to the plane of said panel, and a downwardly extending fender shield supporting foot part extending from said third intermediate part and lying in a plane substantially parallel to the plane of said panel, said second intermediate part being secured to one of said end flanges.

14. A fender shield including a panel portion having top, end and base flanges extending therefrom, and a supporting arm having a base part secured to said base flange, an intermediate part rising from said base part, a second intermedite part extending substantially horizontally from said first intermediate part, and an obliquely downwardly relatively long end part extending from said second intermediate part and providing a supporting foot for said shield at a substantial distance below said base flange of said fender shield, said second intermediate part being secured to one of said end flanges.

HERBERT S. JANDUS.